No. 886,722. PATENTED MAY 5, 1908.
E. NEUMAYER.
TELESCOPE.
APPLICATION FILED FEB. 12, 1907.
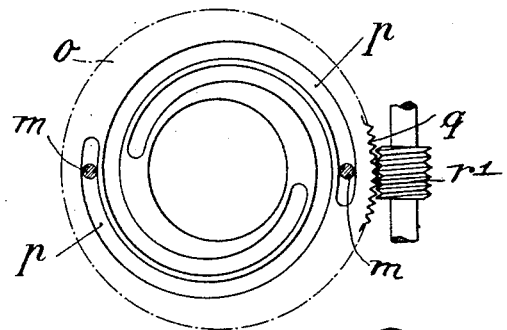
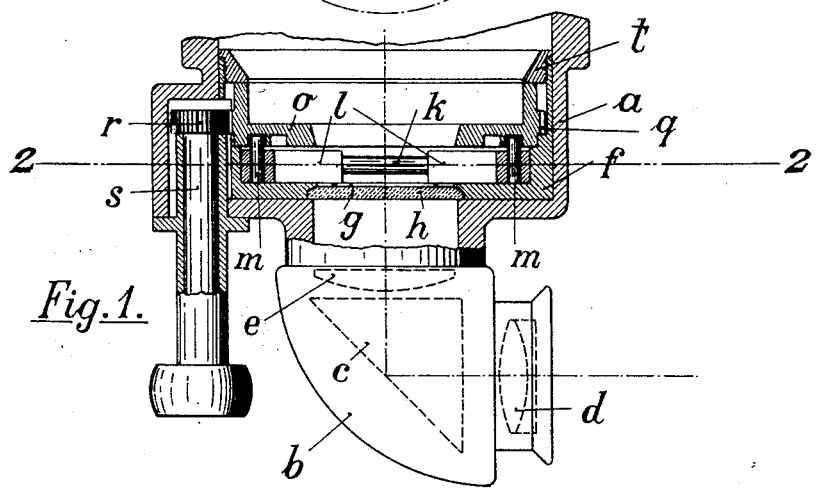
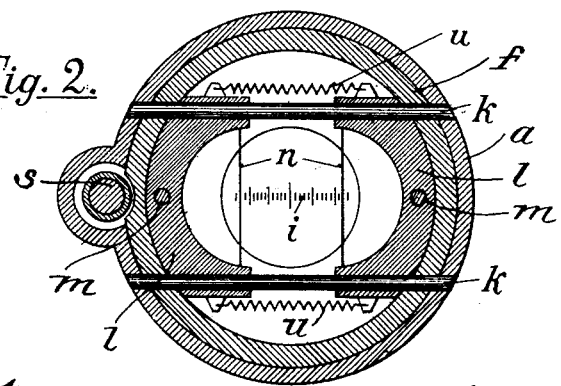

UNITED STATES PATENT OFFICE.

EDMUND NEUMAYER, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

TELESCOPE.

No. 886,722.     Specification of Letters Patent.     Patented May 5, 1908.

Application filed February 12, 1907. Serial No. 356,953.

*To all whom it may concern:*

Be it known that I, EDMUND NEUMAYER, a citizen of the German Empire, and resident of Friedenau, near Berlin, Germany, engineer, have invented certain new and useful Improvements in Telescopes, of which the following is a specification.

My invention relates to sighting telescopes and consists in a simple, compact and reliable construction of the adjusting means for the sighting marks of the instrument.

An embodiment of the invention is represented on the accompanying drawing, in which Figure 1 is an axial section through the upper end of a panoramic telescope. Fig. 2 is a cross-section along the line 2—2 of Fig. 1, Fig. 3 is a top-view of the rotatable actuating disk for the sighting marks in connection, however, with a modified actuating device in the form of a worm $r'$ instead of a toothed wall $r$.

The upper part of a telescope is designated $a$. Rotatably mounted thereon is a cap $d$ carrying a prism $c$ and lenses $d$, $e$. Firmly inserted into the hollow of the part $a$ is a carrying member $f$ having a central opening $g$ provided with a transparent plate $h$ carrying a graduation $i$. Firmly connected to the member $f$ are two guiding rods $k$, carrying two slides $l$, each provided with a pin $m$. Each sliding piece $l$ carries a mark in the form of a thread $n$ arranged in proximity to the graduation $i$.

$o$ is an actuating ring provided with two spiral grooves $p$, each groove coacting with one pin $m$ of the sliding pieces $l$. The actuating ring $o$ is provided with a toothed rim $q$ meshing with a pinion $r$ fixed on the lower end of an actuating rod $s$.

$t$ is a screw-threaded ring, screwed into the lower end of the part $f$ and securing the plate $o$ in position.

$u$ is a spring connecting the two sliding parts $l$ with each other.

The operation of the above described device is as follows: Assuming that it is intended to adjust the threads $n$ in any desired manner, then the rod $s$ is rotated by grasping the knob at its free end. The pinion $r$ communicates the rotation to the plate $o$, coacting by its grooves $p$ with the pins $m$ of the sliding carriers $l$ of the threads $n$. The grooves $p$ being spiral, the rotation of the plate $o$ effects a sliding movement of the parts $l$ on the guiding rods $k$. In this way the threads $n$ may be adjusted in any desired manner. The graduation $i$ allows an exact determination of the position of the threads $n$. The graduation $i$ and the threads $n$ are substantially arranged in a focal plane of the instrument.

The function of the cap $b$ with the lenses $d$, $e$ and the prism $c$ is the same as in all known panoramic telescopes and therefore needs no explanation in detail.

Having now described and ascertained the nature of my invention, what I claim is:

1. In combination with a telescope two slidably mounted parts, each provided with a mark, a rotatable actuating member for said two slidable parts and a spiral channel and pin connection between each of said two slidable parts and said rotatable actuating member.

2. In combination with a telescope two slidably mounted parts each provided with a mark, a rotatable cam plate provided with two spiral channels and a pin on each of said mark carrying members entering one of said channels of said cam plate.

In testimony whereof I have signed this specification in the presence of two subscribing witnesses.

EDMUND NEUMAYER.

Witnesses:
    WOLDEMAR HAUPT,
    HENRY HASPER.